(12) United States Patent
Dobberphul

(10) Patent No.: US 12,709,306 B2
(45) Date of Patent: Aug. 18, 2026

(54) METHOD FOR OPERATING AN AT LEAST PARTIALLY AUTOMATED VEHICLE IN A MANUAL DRIVING MODE, COMPUTER PROGRAM PRODUCT AND SYSTEM

(71) Applicant: Volkswagen Aktiengesellschaft, Wolfsburg (DE)

(72) Inventor: Timo Dobberphul, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 21 days.

(21) Appl. No.: 18/726,750

(22) PCT Filed: Dec. 14, 2022

(86) PCT No.: PCT/EP2022/085944
§ 371 (c)(1),
(2) Date: Jul. 3, 2024

(87) PCT Pub. No.: WO2023/131490
PCT Pub. Date: Jul. 13, 2023

(65) Prior Publication Data

US 2025/0065925 A1 Feb. 27, 2025

(30) Foreign Application Priority Data

Jan. 5, 2022 (DE) ......................... 102022200062.5

(51) Int. Cl.
*B60W 60/00* (2020.01)
*B60W 30/182* (2020.01)
(Continued)

(52) U.S. Cl.
CPC ...... *B60W 60/0053* (2020.02); *B60W 30/182* (2013.01); *B60W 40/08* (2013.01);
(Continued)

(58) Field of Classification Search
None
See application file for complete search history.

(56) References Cited

U.S. PATENT DOCUMENTS 10,059,346 B2 * 8/2018 Miller .................. B60W 40/08
10,082,791 B2 * 9/2018 Bertollini .............. B60K 35/28
(Continued)

FOREIGN PATENT DOCUMENTS

DE 102012202294 A1 8/2013
DE 102014011864 A1 2/2016
(Continued)

OTHER PUBLICATIONS

PCT/EP2022/085944. International Search Report (Mar. 1, 2023).
Priority German Application No. 102022200062.5. Office Action (Oct. 31, 2022).

*Primary Examiner* — Jonathan M Dager
(74) *Attorney, Agent, or Firm* — Peter Zura; LOZA & LOZA, LLP

(57) ABSTRACT

A method for operating a vehicle having at least one functional unit for performing a driving function, wherein the functional unit is controllable by a control unit of the vehicle to execute the driving function in an automated driving mode. The method includes carrying out an initialization process to activate a manual driving mode for externally controlling the driving function via an operating device. Additionally, the disclosure pertains to a computer program product and a system associated with the vehicle.

20 Claims, 2 Drawing Sheets

(51) Int. Cl.

*B60W 40/08* (2012.01)
*B60W 50/08* (2020.01)
*B60W 50/00* (2006.01)

(52) U.S. Cl.

CPC ...... *B60W 50/082* (2013.01); *B60W 60/0015* (2020.02); *B60W 60/0059* (2020.02); *B60W 2050/0064* (2013.01); *B60W 2540/043* (2020.02); *B60W 2540/227* (2020.02); *B60W 2556/45* (2020.02)

(56) References Cited

U.S. PATENT DOCUMENTS

| | | | | |
|---|---|---|---|---|
| 10,635,104 | B2 * | 4/2020 | Fox | G05D 1/0061 |
| 11,099,561 | B1 | 8/2021 | Kentley-Klay | |
| 11,254,286 | B2 * | 2/2022 | Hrabak | B60R 25/24 |
| 11,277,741 | B2 * | 3/2022 | Schroeder | G06Q 10/02 |
| 11,312,395 | B2 * | 4/2022 | Schöning | G07C 9/30 |
| 11,372,465 | B1 * | 6/2022 | Srinivasan | G06F 1/28 |
| 11,429,132 | B1 * | 8/2022 | Yasuda | B60K 26/02 |
| 11,433,915 | B2 * | 9/2022 | Fishwick | B60W 50/12 |
| 11,634,036 | B2 * | 4/2023 | Cho | B60W 30/18127 701/22 |
| 11,780,453 | B2 * | 10/2023 | Aggoune | B60W 10/04 701/87 |
| 11,858,497 | B2 * | 1/2024 | Balachandran | B60W 30/02 |
| 2007/0142169 | A1 * | 6/2007 | Marcil | B60K 28/06 477/107 |
| 2011/0010034 | A1 * | 1/2011 | Zagorski | B60W 50/12 701/31.4 |
| 2012/0179304 | A1 * | 7/2012 | Tokumochi | B60W 50/10 701/1 |
| 2012/0209488 | A1 * | 8/2012 | Nagaya | B60W 10/06 701/70 |
| 2013/0041564 | A1 * | 2/2013 | Doi | B60T 7/22 701/70 |
| 2014/0088814 | A1 * | 3/2014 | You | B60W 50/082 701/23 |
| 2018/0373244 | A1 * | 12/2018 | Augst | B60N 3/063 |
| 2019/0092341 | A1 * | 3/2019 | Stark | B60W 10/04 |
| 2019/0375409 | A1 * | 12/2019 | Hunt | B60W 30/182 |
| 2020/0062265 | A1 * | 2/2020 | Wunderlich | B60K 28/02 |
| 2020/0094847 | A1 * | 3/2020 | Goldman | G01S 17/10 |
| 2020/0139991 | A1 | 5/2020 | Kim | |
| 2020/0409351 | A1 * | 12/2020 | Zhu | G05D 1/0016 |
| 2021/0094529 | A1 * | 4/2021 | Mizoguchi | B60W 10/04 |
| 2021/0132604 | A1 | 5/2021 | Gillett | |
| 2021/0213942 | A1 * | 7/2021 | Kayano | B60W 30/09 |
| 2021/0213974 | A1 * | 7/2021 | Shimbo | G08G 1/165 |
| 2021/0347376 | A1 * | 11/2021 | Klesing | B60W 60/001 |
| 2021/0387633 | A1 * | 12/2021 | Shimomura | B60W 50/087 |
| 2021/0394800 | A1 * | 12/2021 | Kwak | G07C 5/0808 |
| 2022/0032959 | A1 * | 2/2022 | Homma | B60W 10/20 |
| 2022/0161812 | A1 * | 5/2022 | Takenaka | B60W 50/12 |
| 2023/0141314 | A1 * | 5/2023 | Dobashi | B60W 30/143 701/23 |
| 2024/0001950 | A1 * | 1/2024 | Ravuri | B60W 50/12 |
| 2025/0074358 | A1 * | 3/2025 | Kasai | B60R 25/241 |

FOREIGN PATENT DOCUMENTS

| | | | |
|---|---|---|---|
| DE | 102017007119 | A1 | 1/2019 |
| DE | 102018208889 | A1 | 12/2019 |
| DE | 102018127270 | A1 | 4/2020 |
| DE | 102019206446 | A1 | 11/2020 |
| DE | 102019206447 | A1 | 11/2020 |
| DE | 102020211828 | A1 | 12/2021 |
| WO | 2019032292 | A | 2/2019 |

* cited by examiner

METHOD FOR OPERATING AN AT LEAST PARTIALLY AUTOMATED VEHICLE IN A MANUAL DRIVING MODE, COMPUTER PROGRAM PRODUCT AND SYSTEM

RELATED APPLICATIONS

The present application claims priority to International Patent Application No. PCT/EP2022/085944 to Timo Dobberphul, filed Dec. 14, 2022, titled "Method For Operating An At Least Partially Automated Vehicle In A Manual Driving Mode, Computer Program Product And System," which claims priority to German Patent Application No. 10 2022 200 062.5, filed Jan. 5, 2022, the contents of each being incorporated by reference in their entirety herein.

TECHNICAL FIELD

The present disclosure relates to technologies and techniques for operating a vehicle comprising at least one functional unit for carrying out a driving function of the vehicle, to a computer program product, and to a system.

BACKGROUND

Autonomous driving vehicles are known from the prior art. Since autonomous vehicles according to SAE Level 4 or 5, for example, do not require a driver's seat for normal operation, they are generally not equipped with conventional, manual control options. This means that autonomous vehicles according to SAE Level 4 or 5, for example, have no steering wheel, no brake pedal and/or no gas pedal. In certain situations, however, it may nonetheless be advantageous to be able to manually control such autonomous vehicles. This is necessary to be able to move these vehicles in the event that of a failure of the automatic control unit and/or in an unknown environment. There are also applications for manual control in terms of the maintenance and production of these vehicles since the automatic control is not available or not designed for these special instances.

It is known from U.S. Pat. No. 11,099,561 B1 to provide a manual driving mode in an autonomously driving vehicle, in which the vehicle can be controlled by an external device when the vehicle travels through a unmapped region. However, there is room for improvement in terms of the safety architecture for the communication with the external device.

SUMMARY

Aspects of the present disclosure are directed to to at least partly eliminating the aforementioned disadvantages known from the prior art. In particular, aspects of the present disclosure are directed to improving the safety when operating an at least partially automated vehicle in a manual operating mode.

Certain aspects are disclosed in the respective subject-matter of the independent claims. Further implementations and preferred embodiments are the subject-matter of the dependent claims.

Further features and details will be apparent from the description and the drawings. It should be understood that features and details that are described in connection with the method also apply in connection with the computer program product and/or the system according to the present disclosure, and vice versa, so that mutual reference is made, or can be made, in each case to the individual aspects with respect to the disclosure.

In some examples, a method is disclosed for operating a vehicle. The vehicle may include at least one functional unit for carrying out a driving function of the vehicle. The functional unit can be activated by a control unit of the vehicle for carrying out the driving function in an automated manner in an automated driving mode. The method includes carrying out an initialization process for activating a manual driving mode for the external activation of the driving function via an operating device, in particular by the control unit; obtaining external operating information for the, in particular indirect, activation of the driving function in the manual driving mode from the operating device by the control unit, wherein the operating information encompasses first operating data obtained by a first module of the control unit, and second operating data obtained by a second module of the control unit; and transmitting internal control information for the, in particular direct, activation of the driving function to the functional unit as a function of the external operating information by the control unit.

In some examples, a computer program product is disclosed that encompasses commands that, during execution by a control unit, prompt the control unit to carry out a method according to the present disclosure.

The computer program product according to the present disclosure thus entails the same advantages as those that were already described herein with respect to methods according to the present disclosure. The method may be configured as a computer-implemented method. The computer program product can be implemented as computer-readable instruction code. The computer program product can furthermore be stored on a computer-readable memory medium such as a data disk, a removable drive, a volatile or non-volatile memory, or an integrated memory/processor. Furthermore, the computer program product can be providable or be provided in a network, such as the Internet, from where it can be downloaded or executed online by a user as needed. The computer program product can be implemented both by means of software and by means of one or more special electronic circuits, that is, as hardware or in any hybrid form, that is, by means of software components and hardware components.

In some examples, a system is disclosed, comprising a functional unit for a vehicle for carrying out a driving function of the vehicle and an operating device for a manual driving mode for the external activation of the driving function. The system further comprises a control unit for the vehicle by which the functional unit can be activated for carrying out the driving function in an automated manner in an automated driving mode. The control unit is furthermore designed to carry out a method according to the present disclosure.

The system according to the invention thus entails the same advantages as those that are described herein with respect to a method and/or a computer program product according to the present disclosure. It may be provided that the vehicle is part of the system. The operating device can be configured as an external operating device, e.g., outside the vehicle, or as an internal operating device to be permanently arranged inside the vehicle. The operating device can include a releasable plug connection for the connection to the vehicle. The functional unit may be a braking device, a steering device and/or a drive device. The system furthermore comprises multiple functional units, which can be activated by the control unit in the manual and/or automated driving modes.

BRIEF DESCRIPTION OF THE DRAWINGS

Additional advantages, features and details will be apparent from the following description, which describes in detail exemplary embodiments with reference to the drawings. The features described in the claims and in the description can be pertinent to the invention either alone or in any arbitrary combination. In the schematic drawings:

DETAILED DESCRIPTION

Figure 1:
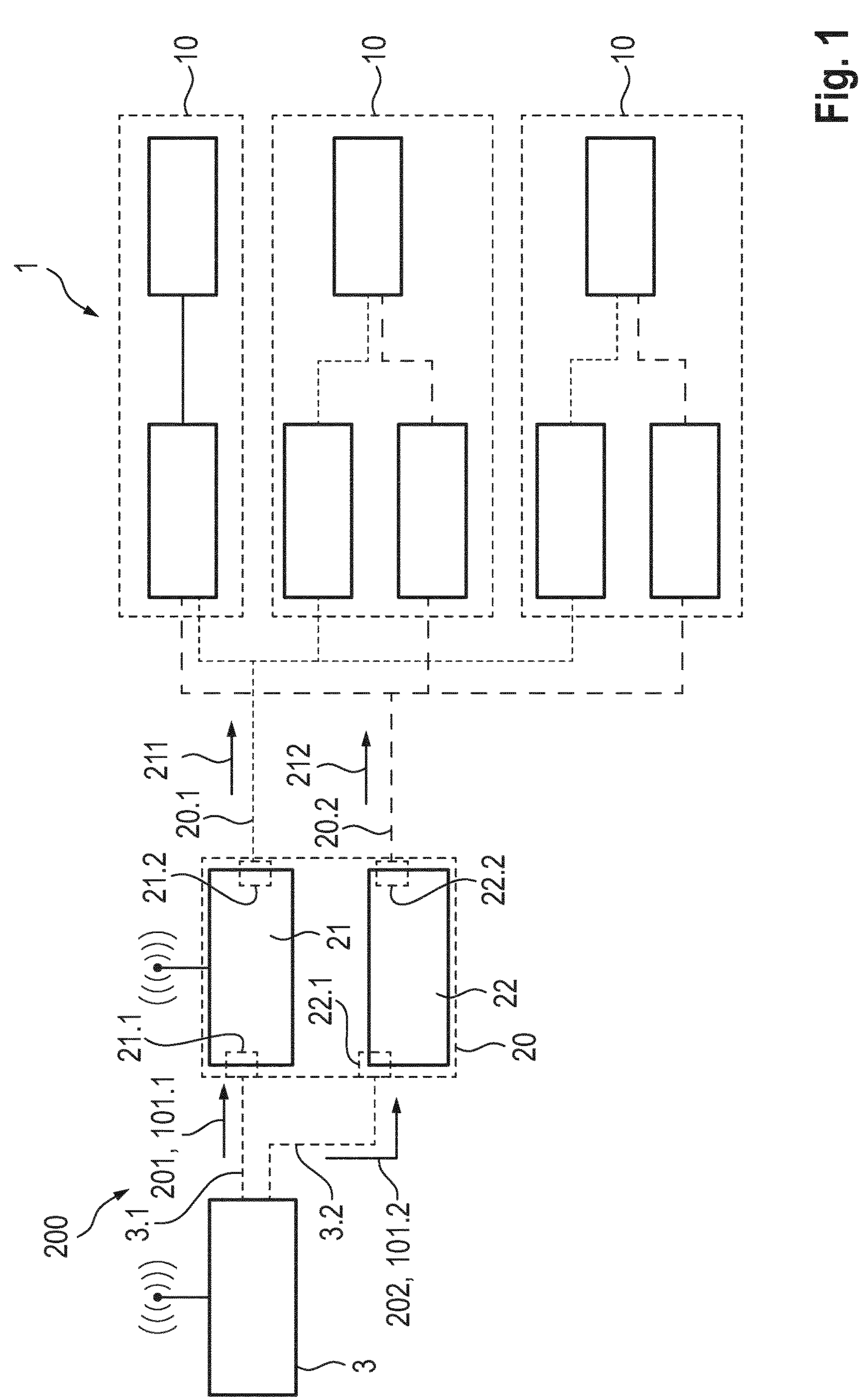
FIGS. 1 and 2 show a system comprising a control unit for carrying out a method according to some aspects of the present disclosure.

The following description of several exemplary embodiments of the present disclosure use identical reference numerals for the same technical features, including those in different exemplary embodiments.

The following description of several exemplary embodiments of the present disclosure uses identical reference numerals for the same technical features, including those in different exemplary embodiments.

The driving function is a feature essential for the operation of the vehicle. This function can influence the vehicle's acceleration and/or route, including steering, acceleration, and/or braking. Carrying out the driving function in an automated manner involves autonomous operation of the functional unit by the control unit. In some examples, the vehicle may have multiple functional units for driving functions that the control unit can automate. The vehicle is preferably an autonomously operable vehicle, compliant with SAE Level 4 or 5 standards.

The control unit may be a central processing unit of the vehicle, configured to perform driving functions automatically and preferably operate the vehicle autonomously. This unit can include a processor and/or microprocessor to carry out the driving function.

It is possible for the driving function and/or vehicle to operate in an automated driving mode before the initialization process begins. The initialization process can include switching from automated to manual driving mode. For instance, automated driving mode may terminate when the initialization process starts. This process can be initiated by a vehicle-internal signal or based on the vehicle's driving situation, such as when the automated driving mode has limited functionality. Alternatively, the process can be triggered by an external signal, such as from an operating device, allowing a user to deliberately activate the manual driving mode. In some examples, the initialization process involves obtaining first operating information from the operating device.

During manual driving mode activation, the automated driving mode can be terminated, enabling the processing of external operating information. External activation of the driving function means that external operating information is generated outside the control unit by the operating device and transmitted to the control unit. The operating device can be a mobile device, such as a user's mobile terminal or a control device like a joystick. However, it can also be permanently connected to the control unit.

External operating information can be obtained wirelessly or via a hard-wired connection. The operating device can connect to the control unit through an electrical connection to transmit operating information. The internal control information can also be transmitted from the control unit to the functional unit wirelessly or via a wired connection. Together, the control unit and functional unit, along with any additional functional units, can form an x-by-wire system, specifically a drive-by-wire system.

The first and second operating data can be obtained and processed separately. They can be identical, providing redundant acquisition through first and second communication interfaces, or they can differ. In some examples, the first and second modules are connected for a plausibility check of the external operating information.

The control unit can generate external control information based on external operating information. The information can be processed or forwarded directly to the functional unit as internal control information, potentially after a plausibility check. Conditions for manual driving mode, such as maximum speed or steering angle, can be pre-established, and control information is generated according to these conditions.

The present disclosure recognizes that existing architecture in at least partially automated vehicles can operate driving functions in both automated and manual modes. By obtaining external operating data, the control unit provides a practical manual control option for relevant situations. Using the same control unit for automated driving mode saves space during normal vehicle operation. High safety levels are achieved by separately obtaining the first and second operating data. Dividing the operating information into distinct data sets limits the potential for manipulation or unauthorized intervention in driving operations. Additionally, it allows for early detection of data loss or temporary connection issues during transmission.

In some examples, the internal control information is transmitted based on a plausibility check of external operating information, using the first and second operating data. During transmission, it can be checked if both data sets are obtained completely. If redundantly obtained, the first and second data can be compared for plausibility, ensuring complete transmission. The first operating data may include driving function activation, while the second may serve as a safety signal, which could be continuous or regularly recurring. This setup allows for the interruption of internal control information transmission if the safety signal is lost, enhancing manual driving mode safety.

In some examples, the first module has a communication interface for obtaining first operating data through one channel, while the second module uses a different channel. Physical separation of data through two communication channels improves safety in manual mode. The interfaces enable communication with the operating device using various standards, such as Bluetooth, WLAN, CAN bus, or Ethernet.

In some examples, during the transmission of internal control information, first control data is sent via a first control channel and second control data via a second channel. This redundancy in transmission helps prevent malfunctions from faulty data transfers. The first module includes a transmission interface for sending first control data, and the second module does the same for second control data. The functional unit has receiver modules for each, ensuring reliable transmission and potential integration into an existing x-by-wire system for manual mode.

In some examples, the initialization process includes user authentication, where first and second authentication data are received by their respective modules. Manual mode is activated based on this data. The process checks user access authorization, possibly through a unique ID or other methods like a password or PIN. Authentication can occur separately for each data set, requiring both to be successful for activation. Data comparison enhances security by preventing unauthorized access.

In some examples, during the initialization process, user location data is detected to activate manual mode based on position data. This data can be GPS-based or relative to the vehicle or control unit. The process can verify if the operating device is within the vehicle or a set distance from it, ensuring the user is adequately aware of the driving situation and preventing unauthorized remote access.

In some examples, the method involves recognizing a special situation, such as an emergency, based on control unit analysis, sensor data, or operating data. The control unit generates automated operating information to activate the driving function. This information may be independent of or modify external operating information, enabling a hybrid mode where the control unit can intervene. Sensor data detection can guide this process, or user input may inform the control unit of the situation.

The present disclosure also suggests generating automated operating information for emergency stops to decelerate the vehicle, prioritizing it over external information if a special situation is recognized. This ensures the vehicle reaches a safe state. An emergency stop might trigger if external operating data fails a plausibility check. Prioritizing automated information can prevent collisions detected by the control unit's sensor system, which remains active in manual or hybrid modes. However, in some scenarios, external information is prioritized to enhance user control over the vehicle.

Figure 2:
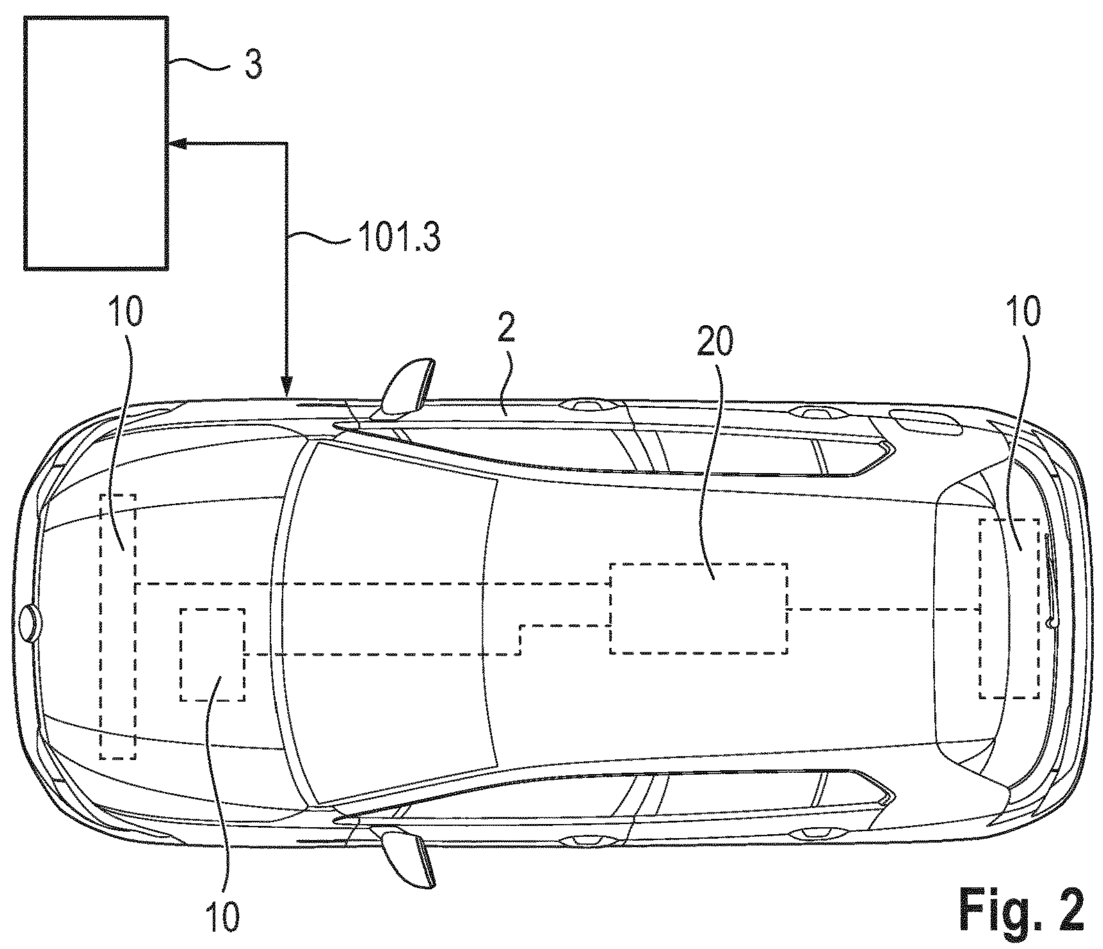

FIG. 1 shows a system 1 according to the present disclosure, comprising at least one functional unit 10 for a vehicle 2 for carrying out a driving function of the vehicle 2 The system 1 furthermore comprises a control unit 20 for the vehicle 2 by which the functional unit 10 for carrying out the driving function in an automated manner in an automated driving mode can be activated. The vehicle 2, which is preferably a fully autonomously operable vehicle 2, is shown in FIG. 2. The vehicle 2 preferably comprises multiple functional units 10, such as a drive, a braking device and/or a steering device, for carrying out different driving functions.

The system 1 furthermore comprises an operating device 3 for a manual driving mode for externally activating at least one of the driving functions. The operating device 3 can preferably comprises a mobile device, such as a mobile terminal of the user. The control unit 20 is furthermore designed to carry out a method 100 according to the present disclosure for operating the vehicle 2. A computer program product can be provided for this purpose, which encompasses commands that, during execution by the control unit 20, prompt the control unit 20 to carry out the method 100. Reference is made hereafter to one of the driving functions. However, it is likewise conceivable that all driving functions of the vehicle 2 can be operated and/or are operated by the control unit 20 in the automated driving mode and the manual driving mode.

Figure 3:
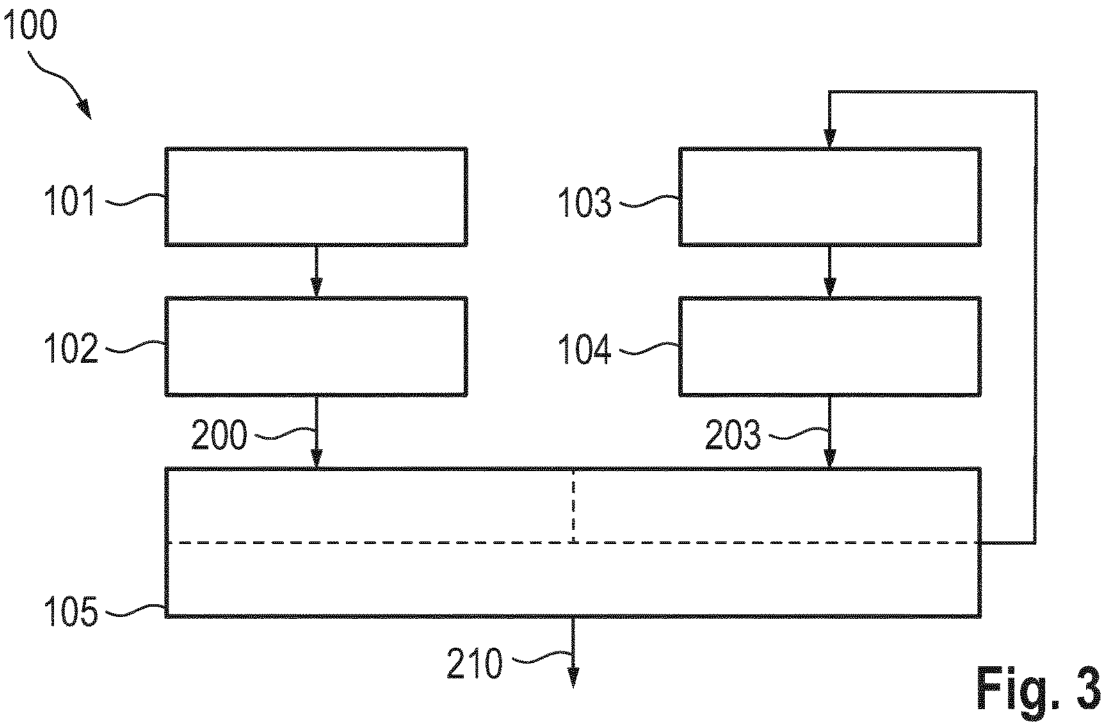
FIG. 3 shows a method in a schematic representation of method steps, according to some aspects of the present disclosure.

A flow of the method 100 is schematically illustrated in FIG. 3. First, an initialization process 101 for activating the manual driving mode for externally activating the driving function via the operating device 3 is carried out. During the initialization process 101, the activation of the driving function in the manual driving mode by the control unit 20 can be enabled. The initialization process 101 preferably includes an authentication process for authenticating a user. Furthermore, position data 101.3 for locating the user can be detected during the initialization process 101 so as to activate the manual driving mode as a function of the position data 101.3.

In the manual driving mode, external operating information 200 for activating the driving function is obtained 102 from the operating device 3 by the control unit 20. The external operating information 200 encompasses first operating data 201, which is obtained by a first module 21 of the control unit 20, and second operating data 202, which is obtained by a second module 22 of the control unit 20. For this purpose, the first module 21 can advantageously comprise a first communication interface 21.1 for obtaining 102 the first operating data 201 via a first communication channel 3.1. The second module 22 can comprise a second communication interface 22.1 for obtaining 102 the second operating data 202 via a second communication channel 3.2. The first and second operating data 201, 202 can encompass the same information, that is, can be redundantly transmitted. However, it is likewise conceivable for the first and second operating data 201, 202 to differ, for example so as to carry out a plausibility check of the first operating data 201 based on the second operating data 202, or vice versa. Furthermore, first authentication data 101.1 can preferably be received by the first module 21 and second authentication data 101.2 can be received by the second module 22 for the authentication process so as to activate the manual driving mode as a function of the first authentication data 101.1 and the second authentication data 101.2.

Furthermore, internal control information 210 for activating the driving function is transmitted 105 by the control unit 20 to the functional unit 10 as a function of the external operating information 200. The internal control information 210 can be generated by the control unit 20 based on the external operating information 200. For example, the external operating information 200 can be forwarded, interpreted and/or modified so as to generate the internal control information 210. In particular, the transmission 105 of the internal control information 210 can be carried out as a function of a plausibility check of the external operating information 200 based on the first operating data 201 and the second operating data 202. So as to also achieve redundancy and/or mutual safeguarding inside the vehicle via a first control channel 20.1 and a second control channel 20.2, first control data 211 of the internal control information 210 can be transmitted via the first control channel 20.1 and second control data 212 of the internal control information 210 can be transmitted via the second control channel 20.2 to the functional unit 10 during the transmission 105 of the internal control information 210. The first module 21 preferably comprises a first transmission interface 21.2 for transmitting the first control data 211 to the functional unit 3, and the second module 22 preferably comprises a second transmission interface 22.2 for transmitting 105 the second control data 212 to the functional unit 10.

The method 100 can furthermore include recognizing 103 a special situation and generating 104 automated operating information 203 for activating the driving function by the control unit 20 as a function of the recognition 103 of the special situation. The special situation can, in particular, be recognized 103 in parallel with receiving and/or after having received the external operating information 200. The special situation can, for example, be detected when the first operating data 201 and second operating data 202 is not plausible, that is, a transmission error exists. However, it is likewise conceivable for the special situation to be recognized by a sensor system of the vehicle 2. In particular, the recognition 103 of the special situation can be carried out recursively during the manual driving mode and/or as a function of a user input. The automated operating information 203 can, for example, be generated for carrying out an emergency stop process for decelerating the vehicle 2, in particular when the special situation is recognized as an emergency situation. The automated operating information 203 can be prioritized over the external operating information 200 as a function of the recognition 103 of the special situation. Internal control information 210 for activating the driving function is thereupon transmitted 105 to the functional unit 10 by the control unit 20 as a function of the automated operating information 203.

It is thus possible by way of the method 100 and/or the system 1 to utilize an existing architecture of an at least partially automated vehicle 2 so as to operate at least one driving function both in the automated driving mode and in the manual driving mode. By separating the first operating data 201 and the second operating data 202, data losses during the manual activation can be recognized at an early stage.

The above description of the embodiments exclusively describes the present disclosure based on examples. If technically expedient, individual features of the embodiments can, of course, be freely combined with each other without departing from the scope of the present disclosure.

LIST OF REFERENCE NUMERALS

1 system
2 vehicle
3 operating device
3.1 first communication channel
3.2 second communication channel
10 functional unit
20 control unit
20.1 first control channel
20.2 second control channel
21 first module
21.1 first communication interface
21.2 first transmission interface
22 second module
22.1 second communication interface
22.2 second transmission interface
100 method
101 initialization process
101.1 first authentication data
101.2 second authentication data
101.3 position data
102 obtaining
103 recognizing
104 generating
105 transmitting
200 external operating information
201 first operating data
202 second operating data
203 automated operating information
210 control information
211 first control data
212 second control data

The invention claimed is:

1. A method for operating a vehicle comprising at least one functional unit for carrying out a driving function of the vehicle, the functional unit being activatable by a control unit of the vehicle for performing the driving function automatically in an automated driving mode, the method comprising:

carrying out an initialization process for activating a manual driving mode for external activation of the driving function via an operating device;

obtaining external operating information for activation of the driving function in the manual driving mode from the operating device by the control unit, wherein the operating information encompasses first operating data obtained by a first module of the control unit, and second operating data obtained by a second module of the control unit; and transmitting internal control information for activating the driving function to the functional unit as a function of the external operating information by the control unit.

2. The method of claim 1, wherein the transmission of the internal control information is based on a plausibility check of the external operating information using the first operating data and the second operating data.

3. The method of claim 1, wherein the first module comprises a first communication interface for obtaining the first operating data via a first communication channel, and the second module comprises a second communication interface for obtaining the second operating data via a second communication channel.

4. The method of claim 1, wherein first control data is transmitted via a first control channel and second control data is transmitted via a second control channel by the control unit during the transmission of the internal control information, such that the internal control information is redundantly transmitted via the first control channel and the second control channel.

5. The method of claim 1, wherein the initialization process includes an authentication process for authenticating a user, wherein first authentication data is received by the first module and second authentication data is received by the second module during the authentication process, and the manual driving mode is activated as a function of the first authentication data and the second authentication data.

6. The method of claim 1, wherein position data for locating the user is detected during the initialization process, with the manual driving mode being activated as a function of the position data.

7. The method of claim 1, further comprising:

recognizing an emergency situation based on sensor data indicating a collision risk, a vehicle malfunction, or a user-initiated alert;

generating automated operating information for activating the driving function by the control unit based on the recognition of the emergency situation; and transmitting internal control information for activating the driving function to the functional unit by the control unit as a function of the automated operating information.

8. The method of claim 7, wherein the automated operating information is generated to carry out an emergency stop process for decelerating the vehicle and wherein the automated operating information is prioritized over the external operating information based on the recognition of the emergency situation.

9. A system for operating a vehicle, comprising:

at least one functional unit configured to carry out a driving function of the vehicle;

a control unit configured to activate the functional unit for performing the driving function automatically in an automated driving mode;

an operating device configured for external activation of the driving function in a manual driving mode;

wherein the control unit is configured to:

carry out an initialization process to activate the manual driving mode via the operating device;

obtain external operating information for activation of the driving function in the manual driving mode from the operating device, wherein the external operating information includes first operating data obtained by a first module of the control unit, and second operating data obtained by a second module of the control unit; and transmit internal control information for activating the driving function to the functional unit as a function of the external operating information.

10. The system of claim 9, wherein the control unit is configured to transmit the internal control information based on a plausibility check of the external operating information using the first operating data and the second operating data.

11. The system of claim 9, wherein the first module comprises a first communication interface for obtaining the first operating data via a first communication channel, and the second module comprises a second communication interface for obtaining the second operating data via a second communication channel.

12. The system of claim 9, wherein the control unit is configured to transmit first control data via a first control channel and second control data via a second control channel during the transmission of the internal control information, such that the internal control information is redundantly transmitted via the first control channel and the second control channel.

13. The system of claim 9, wherein the initialization process includes an authentication process for authenticating a user, wherein first authentication data is received by the first module and second authentication data is received by the second module during the authentication process, and the manual driving mode is activated as a function of the first authentication data and the second authentication data.

14. The system of claim 9, wherein the control unit is configured to detect position data for locating the user during the initialization process, with the manual driving mode being activated as a function of the position data.

15. The system of claim 9, wherein the control unit is further configured to:

recognize an emergency situation based on sensor data indicating a collision risk, a vehicle malfunction, or a user-initiated alert;

generate automated operating information for activating the driving function based on the recognition of the emergency situation; and transmit internal control information for activating the driving function to the functional unit as a function of the automated operating information.

16. The system of claim 15, wherein the automated operating information is generated to carry out an emergency stop process for decelerating the vehicle and wherein the automated operating information is prioritized over the external operating information based on the recognition of the emergency situation.

17. A non-transitory computer-readable medium storing instructions that, when executed by a processor of a vehicle control system, cause the vehicle to:

initiate an initialization process to activate a manual driving mode for external activation of a driving function via an operating device;

acquire external operating information for activating the driving function in the manual driving mode from the operating device, wherein the external operating information includes first operating data acquired by a first module of the control unit and second operating data acquired by a second module of the control unit; and transmit internal control information for activating the driving function to the functional unit based on the external operating information.

18. The non-transitory computer-readable medium of claim 17, wherein the instructions further cause the vehicle to transmit the internal control information based on a plausibility check of the external operating information using the first operating data and the second operating data.

19. The non-transitory computer-readable medium of claim 17, wherein the instructions further cause the vehicle to configure the first module with a first communication interface for acquiring the first operating data via a first communication channel and configure the second module with a second communication interface for acquiring the second operating data via a second communication channel.

20. The non-transitory computer-readable medium of claim 17, wherein the instructions further cause the vehicle to transmit first control data via a first control channel and second control data via a second control channel during the transmission of the internal control information, ensuring that the internal control information is redundantly transmitted via the first control channel and the second control channel.

* * * * *